United States Patent [19]

Jäger et al.

[11] Patent Number: 5,623,061
[45] Date of Patent: Apr. 22, 1997

[54] BENZENE OR NAPHTHALENE AZO DYES CONTAINING SO₂X AND TRIAZINYL FIBER REACTIVE GROUPS, USE THEREOF TO DYE MATERIALS, AND MATERIALS DYED THEREWITH

[75] Inventors: Horst Jäger, Leverkusen; Joachim Wolff, Odenthal, both of Germany

[73] Assignee: Bayer Aktiengesellschaft, Leverkusen, Germany

[21] Appl. No.: 496,750

[22] Filed: Jun. 29, 1995

[30] Foreign Application Priority Data

Jul. 6, 1994 [DE] Germany .................. 44 23 650.6

[51] Int. Cl.⁶ .................. C09B 62/09; C09B 62/513; D06P 1/38
[52] U.S. Cl. .................. 534/637; 534/605; 534/612; 8/549
[58] Field of Search .................. 534/637, 605, 534/612

[56] References Cited

U.S. PATENT DOCUMENTS

| | | | |
|---|---|---|---|
| 4,997,919 | 3/1991 | Schaulin | 534/637 |
| 5,278,293 | 1/1994 | Herd et al. | 534/643 |
| 5,328,995 | 7/1994 | Schaulin et al. | 534/612 X |
| 5,380,827 | 1/1995 | Takahashi et al. | 534/638 |
| 5,391,718 | 2/1995 | Tzikas et al. | 534/391 |
| 5,403,920 | 4/1995 | Klier et al. | 534/635 |
| 5,434,251 | 7/1995 | Herd | 534/637 X |

FOREIGN PATENT DOCUMENTS

| | | |
|---|---|---|
| 0432542 | 6/1991 | European Pat. Off. . |
| 0567036 | 10/1993 | European Pat. Off. . |
| 0568816 | 11/1993 | European Pat. Off. . |

*Primary Examiner*—Fiona T. Powers
*Attorney, Agent, or Firm*—Sprung Horn Kramer & Woods

[57] ABSTRACT

The invention relates to azo reactive dyes of the formula

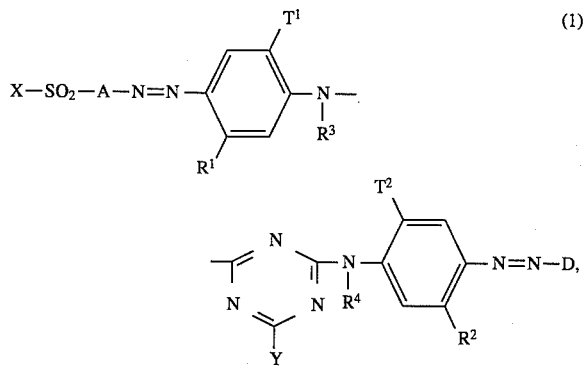

in which
  D denotes the radical of a diazo component of the benzene or naphthalene series,
  X denotes $CH=CH_2$ or $CH_2CH_2-Z$, in which Z denotes a radical which can be eliminated under dyeing conditions, and
in which the remaining substituents are as defined in the description.

The dyes have improved applications-related properties.

10 Claims, No Drawings

BENZENE OR NAPHTHALENE AZO DYES CONTAINING SO₂X AND TRIAZINYL FIBER REACTIVE GROUPS, USE THEREOF TO DYE MATERIALS, AND MATERIALS DYED THEREWITH

The invention relates to novel azo reactive dyes and to their preparation and use.

Azo reactive dyes have already been disclosed in numerous publication, for example DE-A-39 40 266, EP-A-581 729, EP-A-559 617 and EP-A-567 036. However, the known dyes still have some applications-related disadvantages. The present invention relates to reactive dyes of the formula

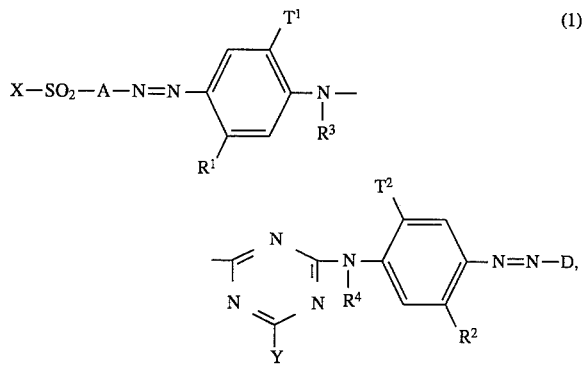

in which

A denotes an optionally substituted phenylene or naphthylene radical, $R^1$ and $R^2$ are identical or different and independently of one another represent hydrogen, methyl, ethyl, methoxy, ethoxy or NHCOE, in which E=NH$_2$, CH$_3$, C$_2$H$_5$, n—C$_3$H$_7$, iso—C$_3$H$_7$, CH$_2$OH or CH$_2$SO$_3$H, $T^1$ and $T^2$ are identical or different and independently of one another represent hydrogen, methyl, ethyl, methoxy or ethoxy, D denotes the radical of a diazo component of the benzene or naphthalene series, $R^3$ and $R^4$ are identical or different and independently of one another represent hydrogen, methyl, ethyl, methoxy or ethoxy, Y represents fluorine, chlorine or an optionally substituted pyridinium radical, and X denotes CH=CH$_2$ or CH$_2$CH$_2$—Z, in which Z denotes a radical which can be eliminated under dyeing conditions.

The radical D may contain a further reactive group having the radical SO$_2$X. Accordingly, a distinction is made between two different series of diazo components, which are represented by the general formulae (2) and (3):

in which $D^1$ denotes a phenyl or naphthyl radical which is free from reactive groups and which is optionally substituted, $D^2$ denotes an optionally substituted phenylene or naphthylene radical, and $X^1$ has one of the definitions given for X.

Examples of substituents of the radicals A and $D^1$ or $D^2$ are the following:

methyl, ethyl, methoxy, ethoxy, chlorine, carboxyl and the sulfonic acid group.

For Z, the following radicals may be mentioned by way of example:

—OSO$_3$H, —OPO$_3$H$_2$, —OCOCH$_3$, —Cl, —OSO$_2$CH$_3$, —S$_2$O$_3$H. Z preferably represents —OSO$_3$H.

Substituents of the pyridinium radical Y are:

methyl, ethyl, carboxyl, carboxamide, sulfonamide and the sulfonic acid group. A preferred definition of Y is chlorine.

In the context of formula (1), preferred dyes are those in which

X represents CH=CH$_2$ or CH$_2$CH$_2$OSO$_3$H,

R represents hydrogen,

Y represents chlorine or fluorine, especially chlorine, $R^1$ and $R^2$ independently of one another represent methyl, aminocarbonylamino, acetylamino or propionylamino, and $T^1$ and $T^2$ represent hydrogen.

Further preference is given to dyes of the formula (1) in which the radical D in the definition of $D^1$ represents the following structures:

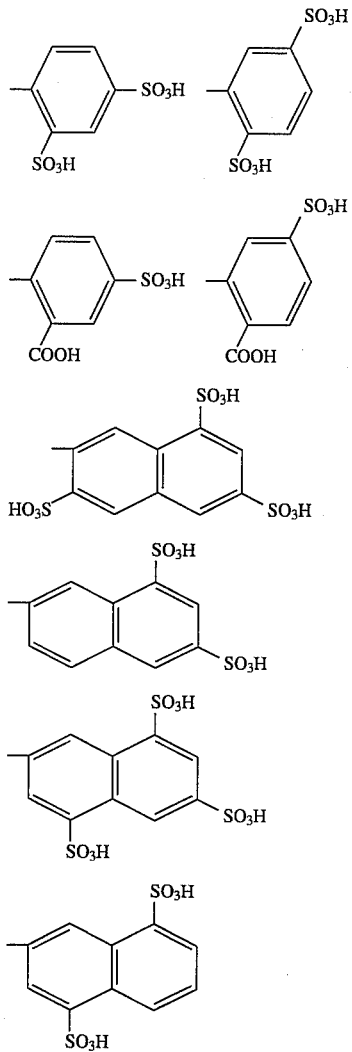

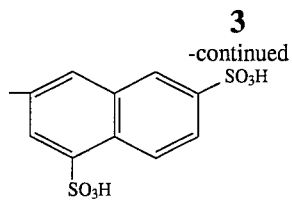
and to those in which the radical D in the definition of —$D^2$—$SO_2X^1$ and A—$SO_2X$, independently of each other, represents one of the following structures:
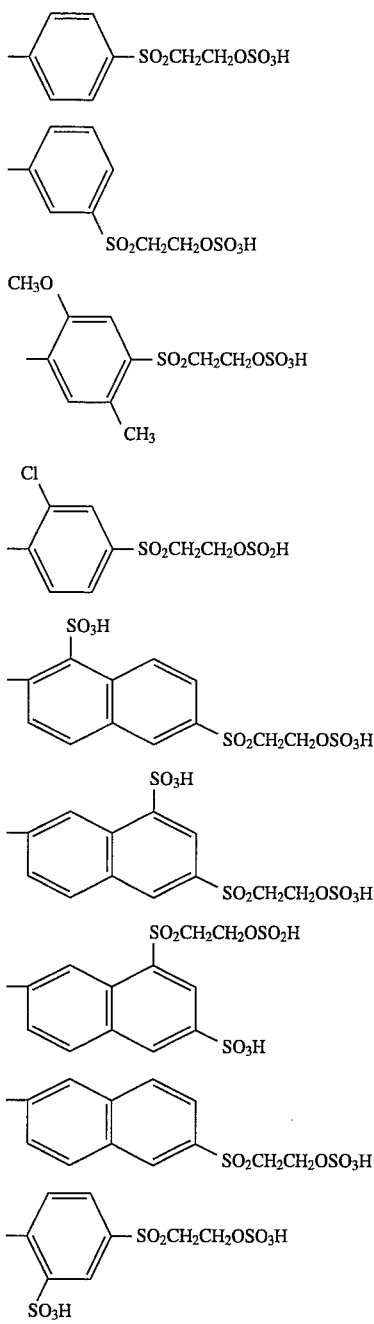
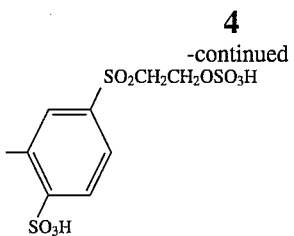
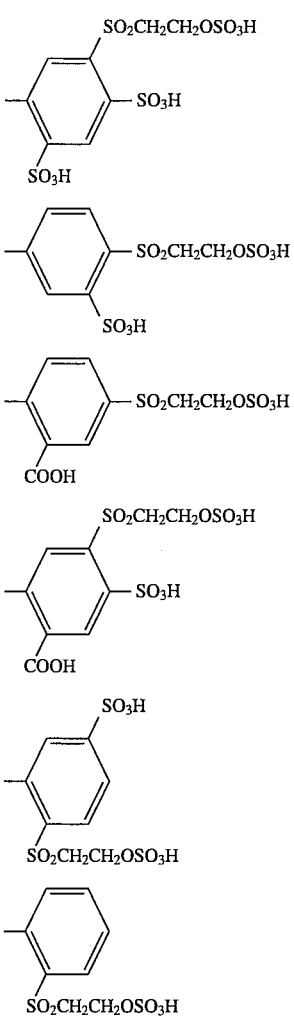
A preferred definition of —A—$SO_2X$ or —$D^2$—$SO_2X^1$ in formula (1) is
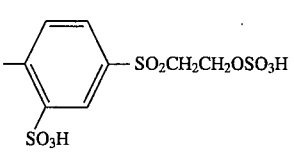
In the context of the formula (1), particular preference is given to the following dyes 2–4:

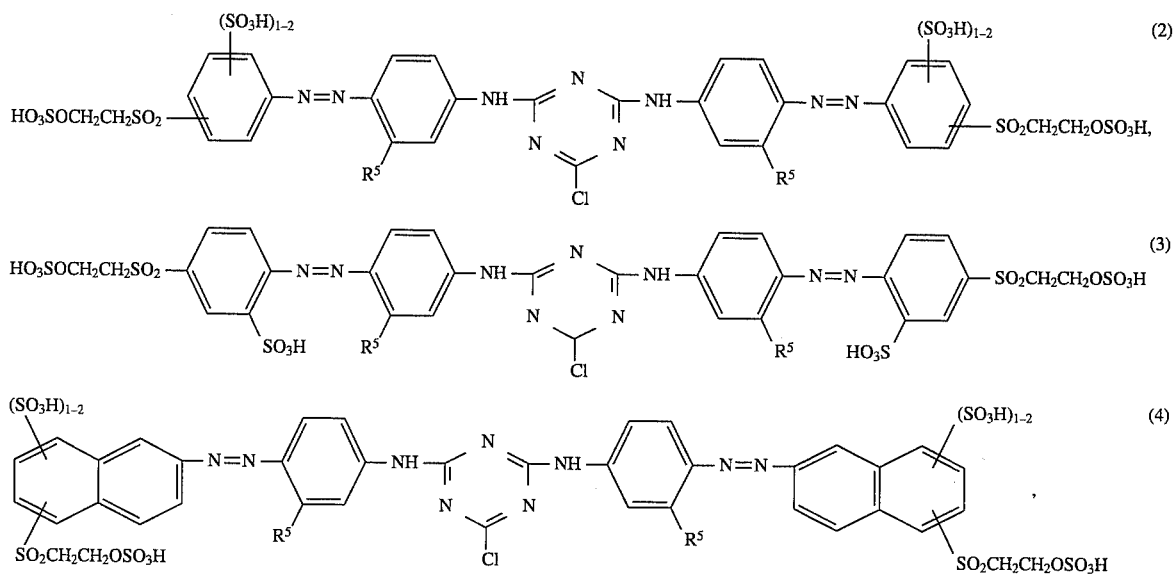

in which $R^5$=independently at each occurrence $CH_3$, $NHCOCH_3$, $NHCONH_2$.

The reaction conditions for the preparation correspond to the conditions which are usual in the area of acylation, diazotization and coupling. Thus, the preparation of the dye intermediates according to the invention is preferably carried out in an aqueous medium.

For instance, a monoazo dye of the formula

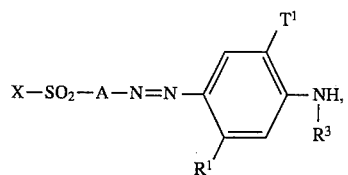

in which

A, $R^1$, $T^1$ and $R^3$ have the definition given, is reacted with a halogenotriazine of the formula

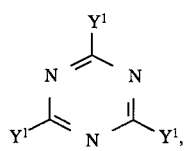

in which $Y^1$ represents chlorine or fluorine,
to give a dye of the formula

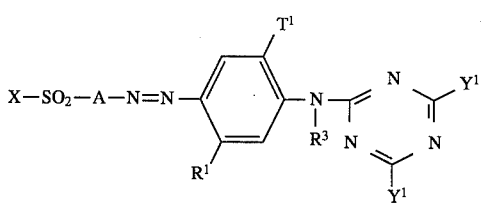

This dye is then condensed with a monoazo dye of the formula

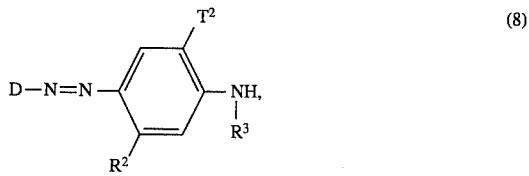

in which

D, $R^2$, $T^2$ and $R^4$ have the definition given,
to give a dye of the formula (1) where Y=chlorine or fluorine.

The dye can also be synthesized in the reverse order, and a monoazo dye (8) initially condensed with a halogenotriazine (6), to form a dye of the formula

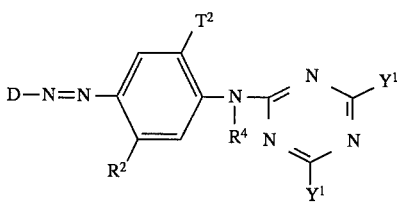

This dye is then condensed with a monoazo dye (5) to give a dye of the formula (1).

In the case where Y represents an optionally substituted pyridinium group, the dye of the formula (1) in which Y=chlorine or fluorine can be reacted with a pyridine compound of the formula

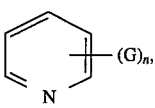

in which

G denotes methyl, ethyl, carboxamide, sulfonic acid or sulfonamide, and in which n=0 to 3 if G represents methyl or ethyl and n=0 to 1 if G represents carboxyl, carboxamide, sulfonic acid or sulfonamide.

The conversion of the halogen substituents Y into a pyridinium substituent is carried out by heating in an aqueous medium at from 40° to 90° C. and in the pH range from 3 to 9, in particular from 5 to 7.

The reactive dyes obtained by the processes described above are isolated in a conventional manner by salting out, for example with sodium chloride or potassium chloride, or by concentrating the neutral aqueous dye solution, preferably at moderately elevated temperature and reduced pressure, or by spray drying. The dyes can be employed as solid preparations or else as concentrated solutions.

In a preferred embodiment the dyes are used as granules. The dye granules can be obtained in the following steps:

Mix-granulation

In this method the dye powder is wetted with from 15 to 55% of water, based on the powder mixture, then the mixture is formed in a mix-granulator and subsequently dried and dedusted, the dedusting agent being sprayed as an aerosol mixture onto the granules.

Spray-granulation

In this method the synthesis solution or suspension is simultaneously dried and granulated in a fluidizing spray-dryer.

Dye powders or dye granules generally contain (in % by weight) from 30 to 80% of a reactive dye of the formula (1), and from 5 to 15% of water, based in each case on the overall composition. In addition they may also contain inorganic salts such as alkali metal chlorides or alkali metal sulfates, dispersants and dedusting agents.

Preferred solid mixtures additionally contain buffer substances which when dissolved in 20 times the quantity of water (based on the weight of the dye preparation) give a pH of from 3.5 to 7.5, in particular from 4.5 to 6.5. These buffer mixtures are added in quantities of from 3 to 50% by weight, in particular from 5 to 15% by weight, based on the overall weight.

Aqueous reactive dye solutions generally contain from 5 to 50% of a dye of the formula (1) (based on the overall weight of the solution).

Preferred aqueous reactive dye solutions additionally contain buffer substances and have a pH of from 3.5 to 7.5, in particular from 4.5 to 6.5. These buffer substances are preferably added in quantities of from 0.1 to 50%, in particular from 1 to 20% by weight, based on the overall weight.

The buffers used are inert towards the reactive groups. Examples of buffers are: sodium dihydrogen phosphate, disodium hydrogen phosphate, potassium dihydrogen phosphate, dipotassium hydrogen phosphate, sodium acetate, potassium acetate, sodium borate, potassium borate, sodium oxalate, potassium oxalate and sodium hydrogen phthalate. These buffers may be employed individually or as a mixture.

The azo compounds (1) possess valuable dye properties. As a result of the fiber-reactive group $SO_2X$ and of the halogenotriazinyl radical, they have fiber-reactive properties.

The reactive dyes of the formula (1) give dyeings with good wet fastness and light fastness properties. It should be emphasized in particular that the dyes have good solubility and electrolyte solubility with good exhaust properties and high dye fixation, and that the unfixed portions can be removed easily.

The novel dyes of formula (1) are suitable for the dyeing and printing of materials which contain hydroxyl or amide groups, such as textile fibers, yarns and fabrics of wool, silk, synthetic polyamide and polyurethane fibers, and for the wash-fast dyeing and printing of natural or regenerated cellulose, the treatment of cellulose materials being carried out advantageously in the presence of acid-binding agents and, if desired, by the action of heat in accordance with the methods which have become known for reactive dyes.

The formulae given are those of the corresponding free acids. The dyes were generally isolated and employed for dyeing in the form of alkali metal salts, in particular the Na salts.

EXAMPLE 1 a) Diazotization 28 ml of 30% strength hydrochloric acid are added to 36.1 g of 4-(β-sulfatoethylsulfonyl)-aniline-2-sulfonic acid in 500 ml of ice-water. 70 ml of 10% strength sodium nitrite solution are then added dropwise and the mixture is stirred until only a slight excess of nitrite can still be detected. This excess is then destroyed with amidosulfonic acid.

b) Coupling 13.5 g of 3-aminophenylurea are dissolved in 400 ml of water with heating giving neutral solution. This solution is added to the diazotization solution obtained according to a), and the pH of the mixture is then adjusted to 3 to 4 by adding sodium hydrogen carbonate, and the mixture is stirred until coupling is complete.

c) Condensation

The solution, obtained according to a), of the monoazo dye of the formula

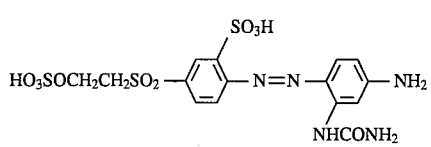

is cooled to 5° to 8° C., and 9.5 g of cyanuric chloride are added. During this procedure the pH is maintained at from 5.0 to 5.5 by addition of sodium hydrogen carbonate. Stirring is continued until no more hydrogen carbonate is consumed. At this point about 50% of the monoazo dye employed has been acylated. The temperature is then raised to 40° to 50° C. and the pH is maintained in the range from 5 to 6 by further addition of sodium hydrogen carbonate. After condensation is complete, the dye is salted out of the clear solution using potassium chloride, filtered off with suction, dried at 70° C. in a circulating-air drying oven and ground. An orange powder is obtained which dissolves readily in water to give a yellow solution.

The dye corresponds to the following formula

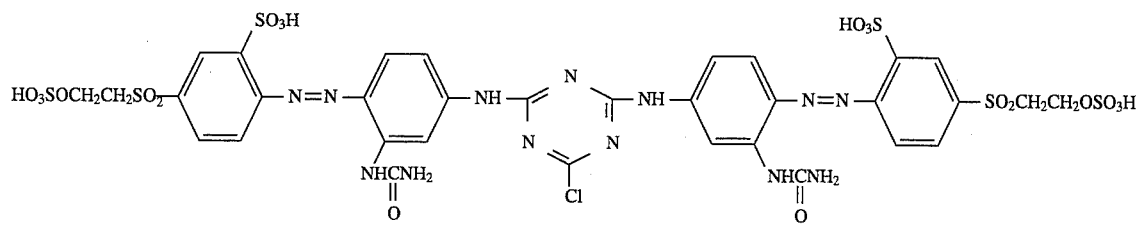

λ_max 400

With this dye, employing one of the dyeing procedures which are customary for reactive dyes having these reactive groups, clear reddish yellow dyeings are obtained on cotton.

If this Example is repeated but with the use in stage a of the diazo components specified in column 2 and in stage b of the coupling components indicated in column 3, equally valuable dyes are obtained which dye cotton in reddish yellow shades.

| Example | Diazo component | Coupling component |
|---|---|---|
| 2 | 4-(β-sulfatoethylsulfonyl)-aniline-2-sulfonic acid | m-toluidine |
| 3 | 4-(β-sulfatoethylsulfonyl)-aniline-2-sulfonic acid | 3-aminoacetanilide |
| 4 | 4-(β-sulfatoethylsulfonyl)-aniline-2-sulfonic acid | 3-propionylaminoaniline |
| 5 | 4-(β-sulfatoethylsulfonyl)-aniline-2-sulfonic acid | 3-hydroacetylaminoaniline |
| 6 | 4-(β-sulfatoethylsulfonyl)-aniline-2-sulfonic acid | 3-sulfatoacetylaminoaniline |
| 7 | 4-(β-sulfatoethylsulfonyl)-aniline-2-sulfonic acid | 3-benzoylaminoaniline |
| 8 | 5-(β-sulfatoethylsulfonyl)-aniline-2-sulfonic acid | m-toluidine |
| 9 | 5-(β-sulfatoethylsulfonyl)-aniline-2-sulfonic acid | 3-aminophenylurea |
| 10 | 5-(β-sulfatoethylsulfonyl)-aniline-2-sulfonic acid | 3-aminoacetanilide |
| 11 | 5-(β-sulfatoethylsulfonyl)-aniline-2,4-disulfonic acid | m-toluidine |
| 12 | 5-(β-sulfatoethylsulfonyl)-aniline-2,4-disulfonic acid | 3-aminophenylurea |
| 13 | 5-(β-sulfatoethylsulfonyl)-aniline-2,4-disulfonic acid | 3-aminoacetanilide |
| 14 | 8-(β-sulfatoethylsulfonyl)-naphthalene-6-sulfonic acid | m-toluidine |
| 15 | 8-(β-sulfatoethylsulfonyl)-naphthalene-6-sulfonic acid | 3-aminophenylurea |
| 16 | 8-(β-sulfatoethylsulfonyl)-naphthalene-6-sulfonic acid | 3-aminoacetanilide |
| 17 | 6-(β-sulfatoethylsulfonyl)-naphthalene-8-sulfonic acid | m-toluidine |
| 18 | 6-(β-sulfatoethylsulfonyl)-naphthalene-8-sulfonic acid | 3-aminophenylurea |
| 19 | 6-(β-sulfatoethylsulfonyl)-naphthalene-8-sulfonic acid | 3-aminoacetanilide |

After reaction the λ_max value for dyes is

| Example | nm |
|---|---|
| 2 | 400 |
| 3 | 400 |

EXAMPLES 20–26

If stages a) and b) are carried out in accordance with Example 1 but using 19 g instead of 9.5 g of cyanuric chloride, the condensation to give the dichlorotriazine dye is carried out in the manner described, 0.09 mol of the monoazo dyes indicated below is employed for the substitution of the second chlorine atom and the dyes are isolated by salting out, filtration with suction, drying and grinding, then equally valuable reactive dyes are obtained which dye cotton in reddish yellow shades.

| Example | Monoazo dye |
|---|---|
| 20 | 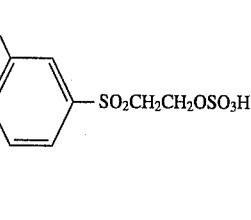 |
| 21 | (SO3H, HO3S, N=N, NH2, NHCONH2) |
| 22 | (SO3H, HO3S, N=N, NH2, NHCOCH3) |
| 23 | (SO3H, HO3S, SO3H, N=N, NH2, CH3) |
| 24 | (SO3H, HO3SOCH2CH2O2S, N=N, NH2, CH3) |
| 25 | (SO3H, HO3SOCH2CH2O2S, N=N, NH2, NHCOCH3) |
| 26 | (SO3H, HO3SOCH2CH2O2S, N=N, NH2, NHCONH2) |

EXAMPLE 27

If stages a) and b) are carried out in accordance with Example 1 but using 7 g of trifluorotriazine instead of 9.5 g of cyanuric chloride in the condensation stage, the acylation being carried out at 0° C. and in the pH range from 5 to 6 which is maintained by dropwise addition of dilute sodium hydroxide solution, and the mixture is subsequently heated to 20° C. for the substitution of the second fluorine atom, likewise maintaining the pH by dropwise addition of dilute sodium hydroxide solution, then the result is a clear yellow solution from which the dye is obtained in the form of a yellowish red powder by salting out, filtration with suction, drying and grinding. The dye dissolves readily in water to give a yellow solution and dyes cotton in clear reddish yellow shades by one of the dyeing procedures which are conventional for reactive dyes having these reactive groups. The dye corresponds to the following formula -continued

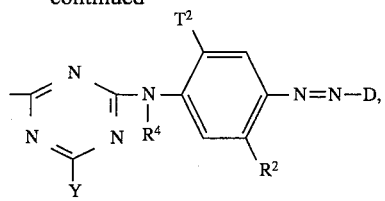

in which

A denotes an optionally substituted phenylene or naphthylene radical,

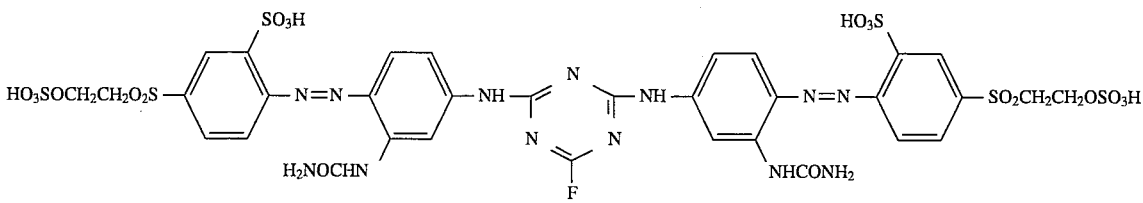

EXAMPLES 28 TO 45

Following Example 27, further valuable reactive dyes are obtained, which dye cotton in reddish yellow shades, if the amino monoazo dyes used in Examples 2 to 19 are employed.

EXAMPLE 46

14 g of pyridine-3-carboxylic acid are added to the solution of the dye obtained according to Example 1, and the mixture is heated at 90° C. for 5 hours at a pH of from 5 to 6. Following the substitution of the chlorine atom by the pyridinium radical, the dye is salted out with potassium chloride, filtered off with suction, dried and ground. An orange dye powder is obtained which dissolves readily in water to give a yellow solution. Using one of the dyeing procedures which are customary for reactive dyes for cotton, reddish yellow dyeings are obtained on cotton. The dye corresponds to the following formula $R^1$ and $R^2$ are identical or different and independently of one another represent hydrogen, methyl, ethyl, methoxy, ethoxy or NHCOE, in which E=$NH_2$, $CH_3$, $C_2H_5$, n—$C_3H_7$, iso—$C_3H_7$, or $CH_2SO_3H$, $T^1$ and $T^2$ are identical or different and independently of one another represent hydrogen, methyl, ethyl, methoxy or ethoxy, D denotes the radical of a diazo component of the benzene or naphthalene series, $R^3$ and $R^4$ are identical or different and independently of one another represent hydrogen, methyl, ethyl, methoxy or ethoxy, Y represents fluorine, chlorine or an optionally substituted pyridinium radical, and X denotes $CH=CH_2$ or $CH_2CH_2$—Z, in which Z denotes a radical which can be eliminated under dyeing conditions.

2. A reactive dye as claimed in claim 1, wherein the radical D comprises a radical $SO_2X$ in which

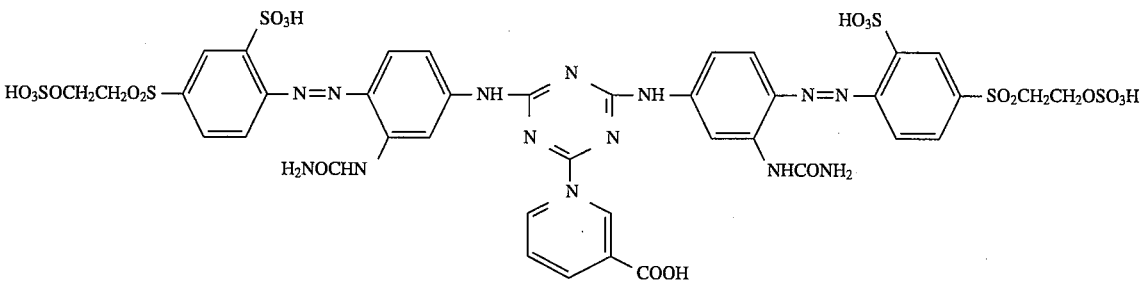

We claim:

1. A reactive dye of the formula

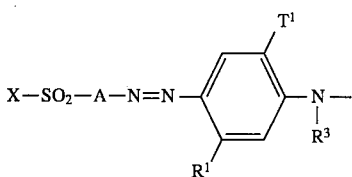

(1)

X denotes $CH=CH_2$ or $CH_2CH_2$—Z, in which Z denotes a radical which can be eliminated under dyeing conditions.

3. A reactive dye as claimed in claim 1, wherein the radicals A and D are unsubstituted or are substituted with methyl, ethyl, methoxy, ethoxy, chlorine, carboxyl or with at least one sulfonyl group.

4. A reactive dye as claimed in claim 1, wherein

Z denotes —$OSO_3H$, —$OPO_3H_2$, —$OCOCH_3$, —Cl, —$OSO_2CH_3$ or —$S_2O_3H$, independently at each occurrence when it occurs more than once.
5. A reactive dye as claimed in claim 1, wherein D denotes
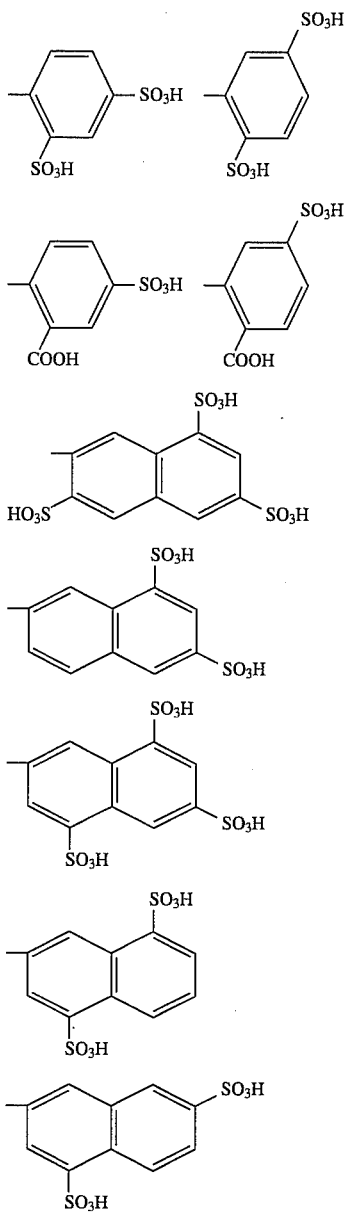
6. A reactive dye as claimed in claim 1, wherein D and the radical A—SO₂X independently of one another have one of the following definitions:
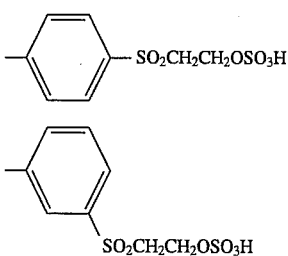
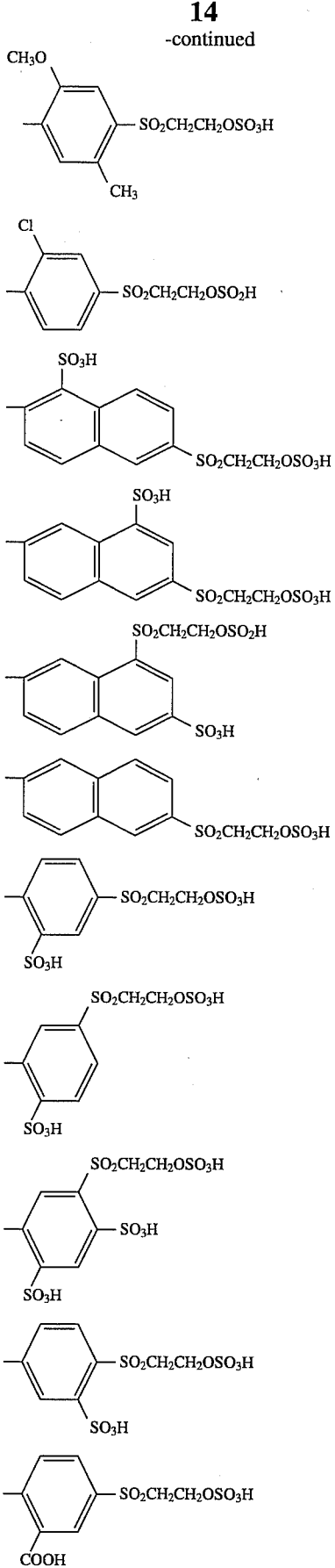

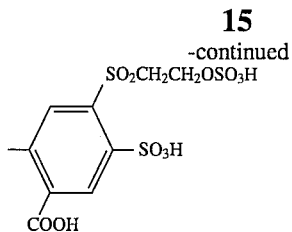

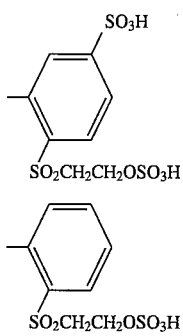

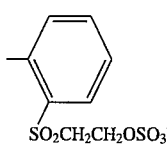

7. A reactive dye as claimed in claim 1, which corresponds to one of the following structures (2), (3) or (4):

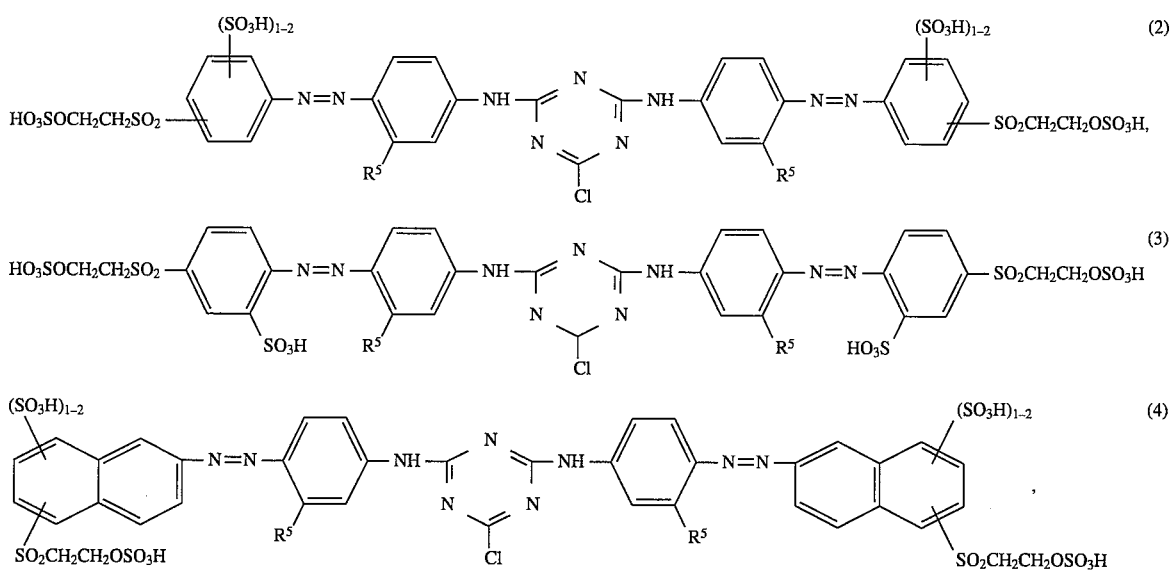

in which the substituents $R^5$ independently of one another denote $CH_3$, $NHCOCH_3$, $NHCONH_2$.

8. A process for the dyeing or printing of a material comprising hydroxyl or amide groups with a reactive dye, said process comprising applying to the material a dye as claimed in claim 1.

9. A dyed material, dyed or printed with a dye as claimed in claim 1.

10. A dyed material according to claim 9, which is based on cellulose or polyamide.

* * * * *

UNITED STATES PATENT AND TRADEMARK OFFICE
CERTIFICATE OF CORRECTION

PATENT NO. : 5,623,061
DATED : April 22, 1997
INVENTOR(S) : Jager, et al.

It is certified that error appears in the above-indentified patent and that said Letters Patent is hereby corrected as shown below:

Col. 3, line 50   Delete " 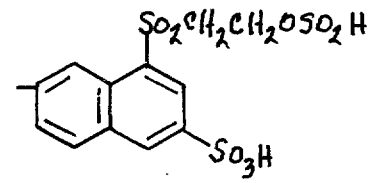 " and substitute -- 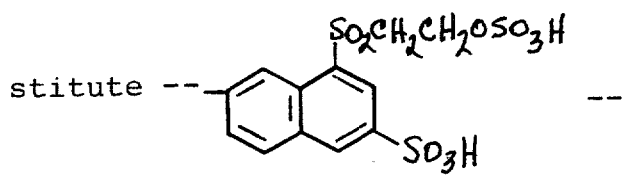 --

Col. 14, line 27  Delete " 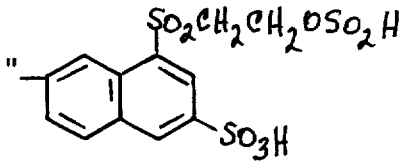 " and sub-

UNITED STATES PATENT AND TRADEMARK OFFICE
CERTIFICATE OF CORRECTION

PATENT NO. : 5,623,061  
DATED : April 22, 1997  
INVENTOR(S) : Jager, et al.

Page 2 of 2

It is certified that error appears in the above-indentified patent and that said Letters Patent is hereby corrected as shown below:

Col. 14, line 27  Cont'd  stitute -- 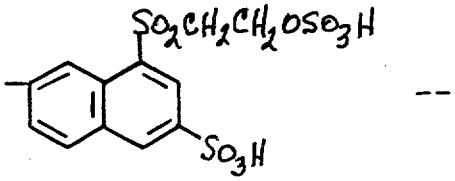 --

Signed and Sealed this

Twenty-sixth Day of August, 1997

Attest:

BRUCE LEHMAN

Attesting Officer

Commissioner of Patents and Trademarks